Oct. 12, 1937.  J. HOJNOWSKI  2,095,440
AEROPLANE
Filed Jan. 18, 1936  3 Sheets-Sheet 1
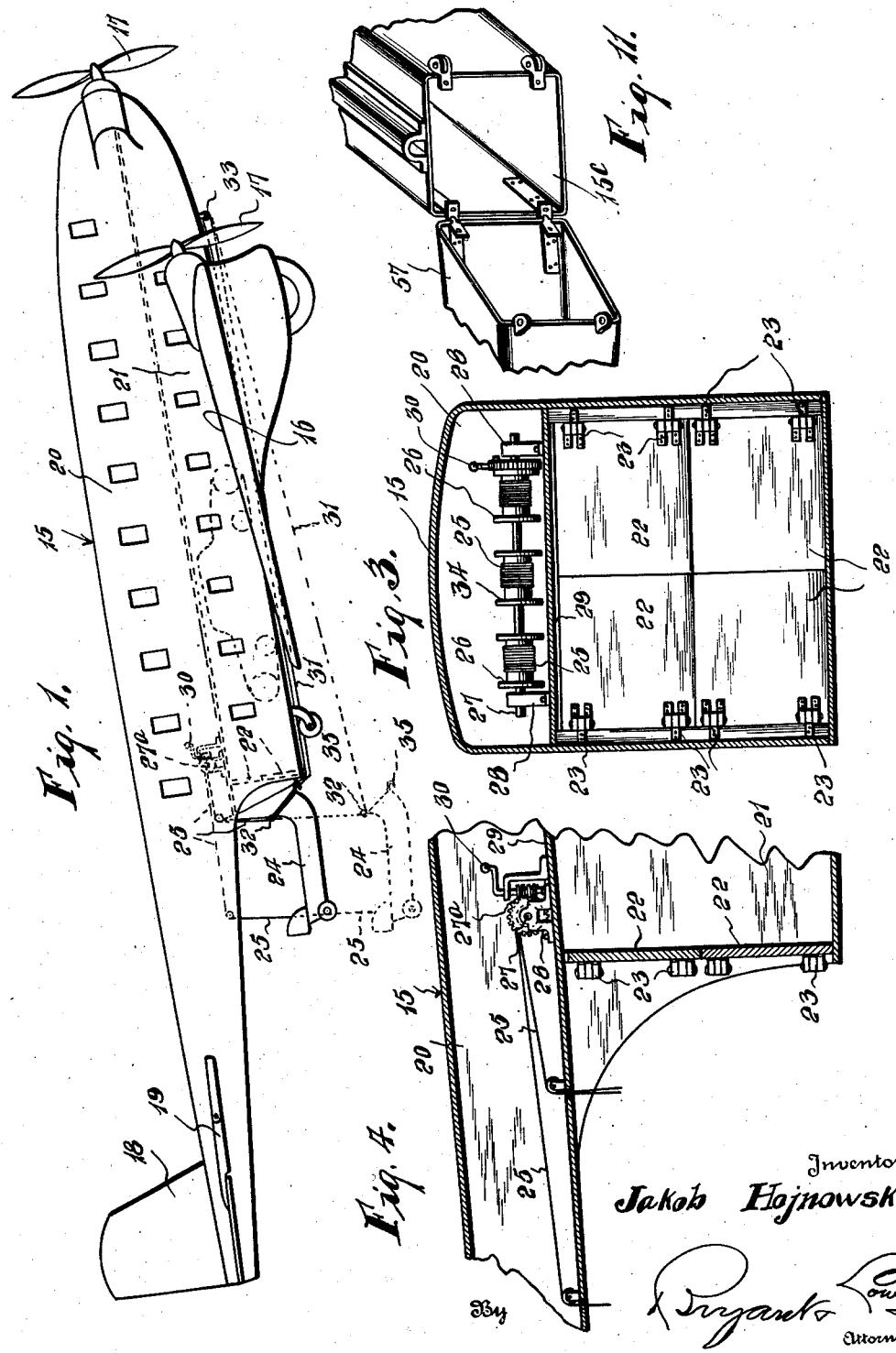
Inventor
Jakob Hojnowski

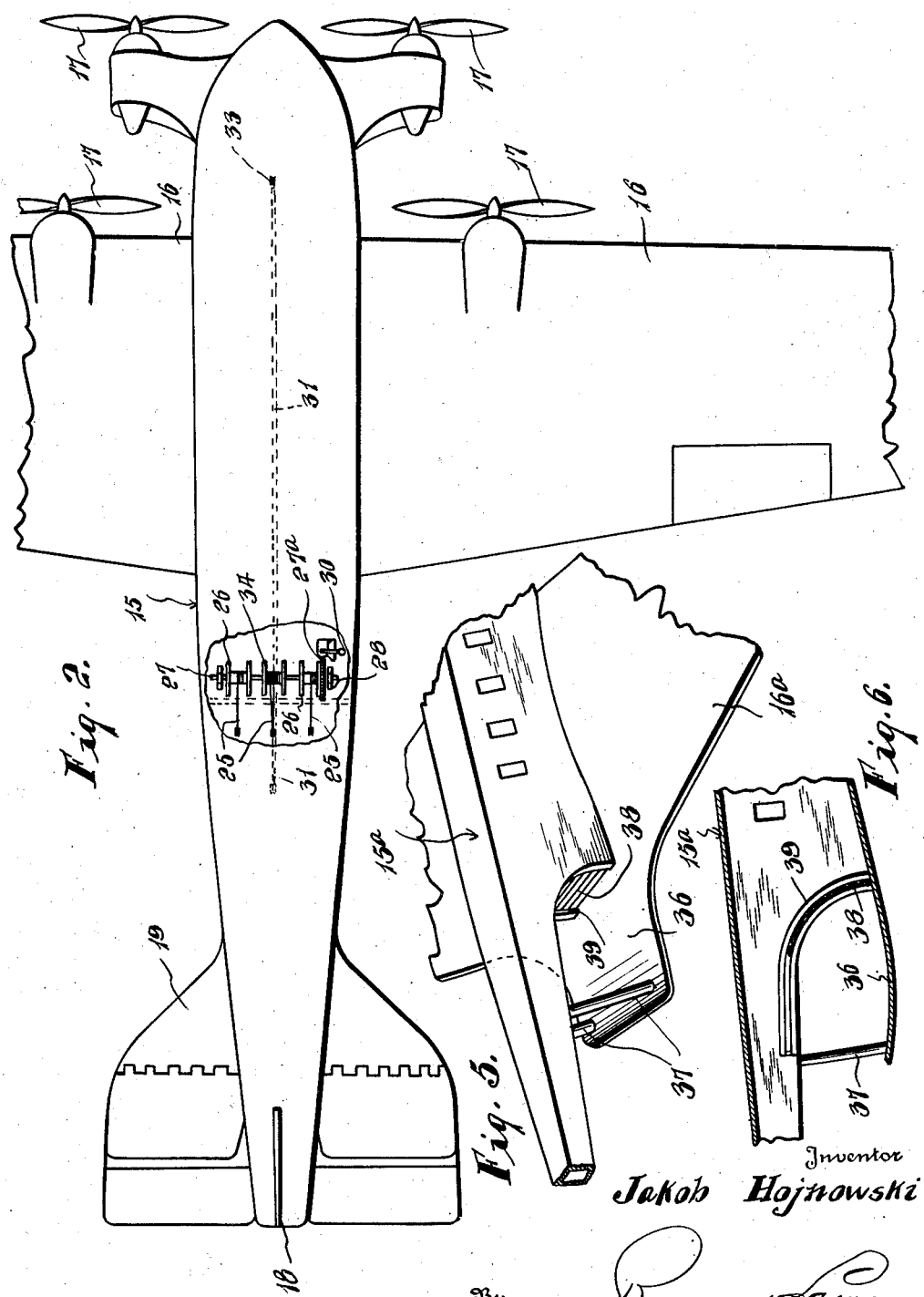

Oct. 12, 1937. J. HOJNOWSKI 2,095,440
AEROPLANE
Filed Jan. 18, 1936 3 Sheets-Sheet 3
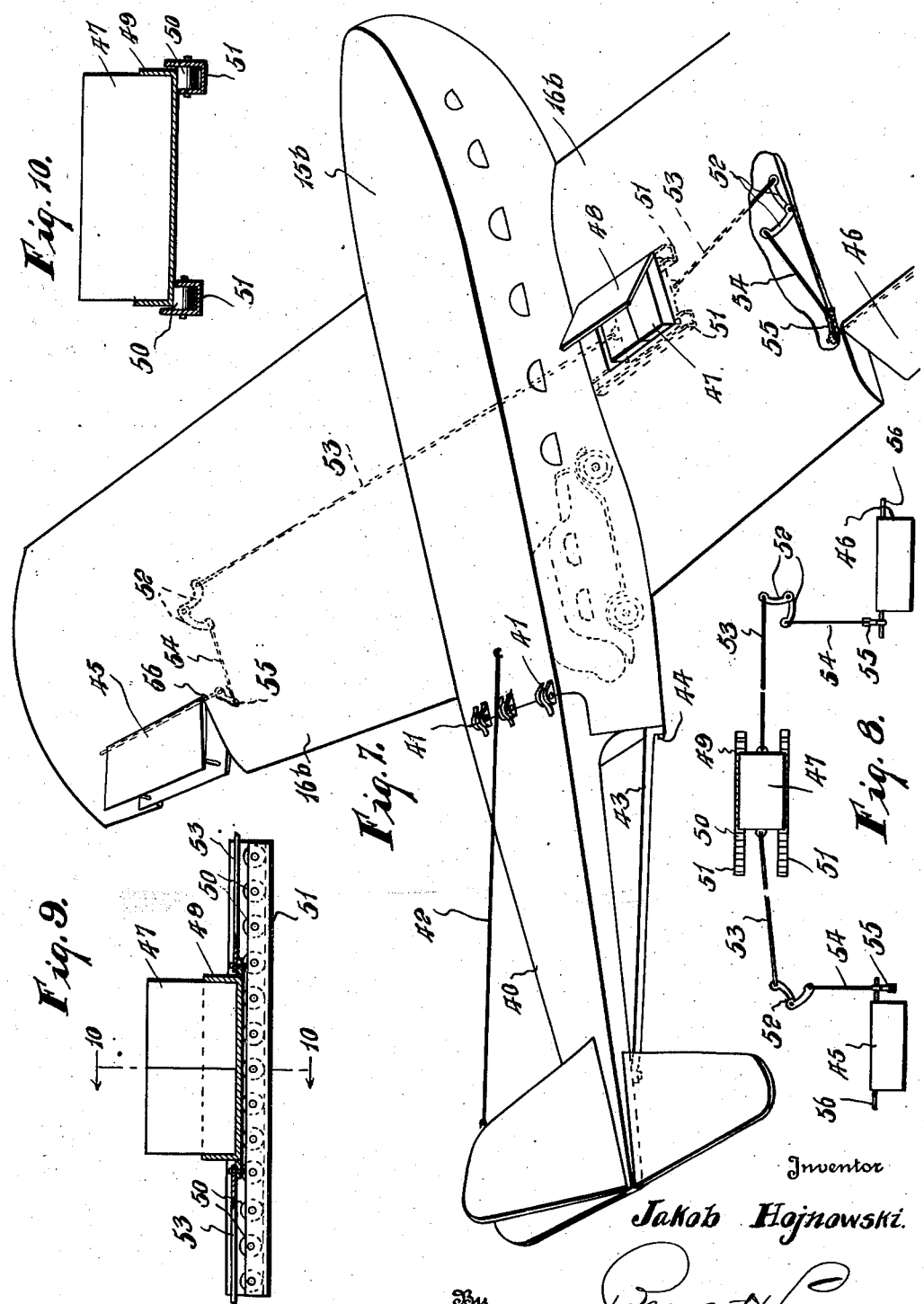
Inventor
Jakob Hojnowski.

Patented Oct. 12, 1937

2,095,440

UNITED STATES PATENT OFFICE 2,095,440

AEROPLANE

Jakob Hojnowski, Nekoosa, Wis.

Application January 18, 1936, Serial No. 59,743

2 Claims. (Cl. 244—118)

This invention relates to certain new and useful improvements in aeroplanes.

An object of the invention is to provide an aeroplane wherein the fuselage is longitudinally divided into an upper passenger compartment and a lower freight carrying compartment that terminates in spaced relation to the rear end of the fuselage with closure gates for the rear end of the freight compartment.

A further object of the invention is to provide an aeroplane of the foregoing character that carries a cable suspended car that may be lowered while the aeroplane is in flight for the discharge of merchandise, mail or the like.

It is a further object of the invention to provide an aeroplane with a compartment therein for freight, such as automobiles, tanks and the like with the tail portion of the fuselage hinged to the main body portion at a point adjacent the rear end of the freight carrying section with the tail portion adapted to be moved on its hinge mounting to permit free access to the rear end of the freight carrying compartment.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an aeroplane constructed in accordance with the present invention and showing an upper passenger compartment and a lower freight compartment in the fuselage with a carriage suspended by cables from the fuselage;

Figure 2 is a fragmentary top plan view of the aeroplane shown in Figure 1 and partly broken away to show the cable drum associated with the cable suspended car;

Figure 3 is a cross-sectional view showing the hinged gate closing the rear end of the freight compartment and the cable drums for the car;

Figure 4 is a fragmentary longitudinal sectional view showing the operating means for the cable by which the car is suspended;

Figure 5 is a fragmentary perspective view showing a center rear extension on the wing of the aeroplane, constituting a loading platform for the freight compartment;

Figure 6 is a fragmentary longitudinal sectional view of the aeroplane shown in Figure 5 and illustrating a sliding door for closing the rear end of the freight compartment;

Figure 7 is a fragmentary perspective view of another form of aeroplane wherein the tail portion of the fuselage is hinged to the main body portion for movement on its hinge mounting to permit free access to the loading end of the freight compartment and further showing operating means for ailerons on the wings;

Figure 8 is a top plan view of the operating mechanism for the ailerons;

Figure 9 is a fragmentary longitudinal sectional view, showing the shiftable weighted element for operating the ailerons;

Figure 10 is a cross-sectional view taken on line 10—10 of Figure 9; and

Figure 11 is a fragmentary perspective view showing a hinged tail portion on a fuselage to swing laterally thereof.

Referring more in detail to the accompanying drawings, and particularly to Figures 1 to 4, the reference character 15 designates the fuselage of an aeroplane equipped with wings 16, a plurality of motor driven propellers 17, a rudder 18 and an elevator 19. The fuselage 15 is longitudinally divided to provide an upper passenger compartment 20 and a lower freight compartment 21, the latter terminating in spaced relation to the rear end of the fuselage to facilitate loading of freight in the lower compartment as clearly illustrated in Figures 1 and 4.

The loading opening at the rear end of the freight compartment 21, as shown in Figures 3 and 4 is closed by a series of superposed doors 22 hingedly supported at their outer vertical edges as at 23 and any number of these doors may be opened as desired for the loading of freight into the compartment 21.

A car 24 is suspended from the upper passenger compartment 20 of the aeroplane adjacent the rear end of the freight compartment 21 so that a person may enter the car from the freight compartment and said car being cable suspended is adapted to be lowered for the discharge of light freight, mail or the like during flight of the aeroplane. The support for the car 24 includes a series of cables 25 attached at one end to the car and having the other ends wound on drums 26 carried by a shaft 27 that is journalled in bracket bearings 28 on the floor 29 of the passenger compartment, the shaft 27 being rotated for the operation of the drums 26 by means of the worm gear mechanism 27a which is manually operated by the crank 30. To stabilize the car 24 when it is lowered from the aeroplane, a cable 31 is attached as at 32, as shown in Figure 1 of the drawings to the forward edge of the carriage 24, the cable 31 extending forwardly beneath the fuselage 15, passing over the guide roller 33 adjacent the forward end thereof and then directed rearwardly and up into the passenger compartment 20 for winding on the drum 34 on the shaft 27. The cable 31 prevents rearward swinging of the car 24 and acts to stabilize the car when the same is lowered from the aeroplane during flight of the latter. When the carriage 24 is in its fully retracted position, the hook 35 at the forward end thereof is engaged with a keeper on the fuselage as shown in Figure 1.

In the form of invention shown in Figures 5 and 6, the aeroplane embodies a fuselage 15a having the underside thereof cut away at the rear end. A wing 16a is associated with the fuselage and carries a central rearwardly projecting loading platform 36 rearwardly of the open rear end of the fuselage 15a. The extreme rear end of the platform 36 is supported and braced by uprights 37 extending between the platform and overhanging portion of the fuselage. The rear open end of the fuselage 15a is adapted to be closed by a sliding door 38 working in arcuate guides 39. The sliding door 38 is movable in the arcuate guide to control access to the fuselage 15a.

As shown in Figures 7 to 10, the fuselage 15b of the aeroplane is equipped with side wings 16d. The rear end 40 of the fuselage is hinged as at 41 to the main body portion of the fuselage at the upper edge thereof, the underside of the hinged rear end 40 being cut away as illustrated to provide a clearance for the open rear end of the body portion 15b to facilitate loading thereof with freight and the like. The rear hinged end 40 is adapted to be swung in an upward direction by means of the cable 42 and said rear end section 40 is adapted to be maintained in alignment with the main body portion 15b by the struts or bars 43 that are detachably engaged as at 44 with the main body portion of the fuselage.

The wings 16b are equipped with automatically operating ailerons 45 and 46 to bring the aeroplane out of side tilting movement. The operating means for the ailerons 45 and 46 includes a weighted member or tank 47 that may be used for the storage of gasolene, the tank 47 being mounted in the wing 16b beneath the hinged cover section 48. A holder 49 supports the tank 47 and is mounted upon guide rollers 50 carried by channel track rails 51 that extend longitudinally of the wing 16b. The connections between the holder 49 and the ailerons include a pair of reversely positioned bell crank levers 52, one end of each bell crank lever having a link rod connection 53 with the adjacent end of the holder 49, while the other leg of each bell crank lever has a link rod connection 54 with an arm 55 extending from a shaft 56 that supports the adjacent aileron. It will be understood from an inspection of Figures 7 and 8 that by sliding movement of the tank 47 in a direction transversely of the fuselage 15d and longitudinally of the wing 16b, the bell crank levers 52 will be operated and in view of the reverse positioning thereof, the ailerons 45 and 46 will be moved to the position shown in Figure 7 and vice versa for bringing the aeroplane to an even keel during flight. The struts or brace bars 43 are disengaged at their forward ends from the main body portion of the fuselage 15b and the rear end 40 of the fuselage is raised on its hinge mounting 41 by means of the cable 42 so that the rear open end of the fuselage is unobstructed for the loading of freight or the like.

As shown in Figure 11, the fuselage 15c has the rear end 57 thereof connected thereto in a manner to swing laterally of the rear open end of the fuselage 15c to facilitate loading of the same.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In an aeroplane of the character described, a fuselage having a compartment therein for freight, mail and the like, the fuselage being of reduced cross-sectional area at the rear end and forming an undercut portion on the bottom thereof, the rear end of the compartment having an entrance opening at the forward end of the undercut portion, a wing carried by the fuselage in the plane of the lower side thereof, a central rear extension on the wing rearwardly of the entrance opening constituting a loading platform and struts between the wing extension and reduced rear end of the fuselage.

2. In an aeroplane of the character described, a fuselage having a compartment therein for freight, mail, and the like, the rear end of the compartment having a door closed entrance opening therein, a wing carried by the fuselage in the plane of the lower side thereof, a central rear extension on the wing rearwardly of the entrance opening and disposed below the rear portion of the fuselage and constituting a loading platform, and brace struts between the rear end of the extension and the overlying portion of the fuselage.

JAKOB HOJNOWSKI.